United States Patent Office

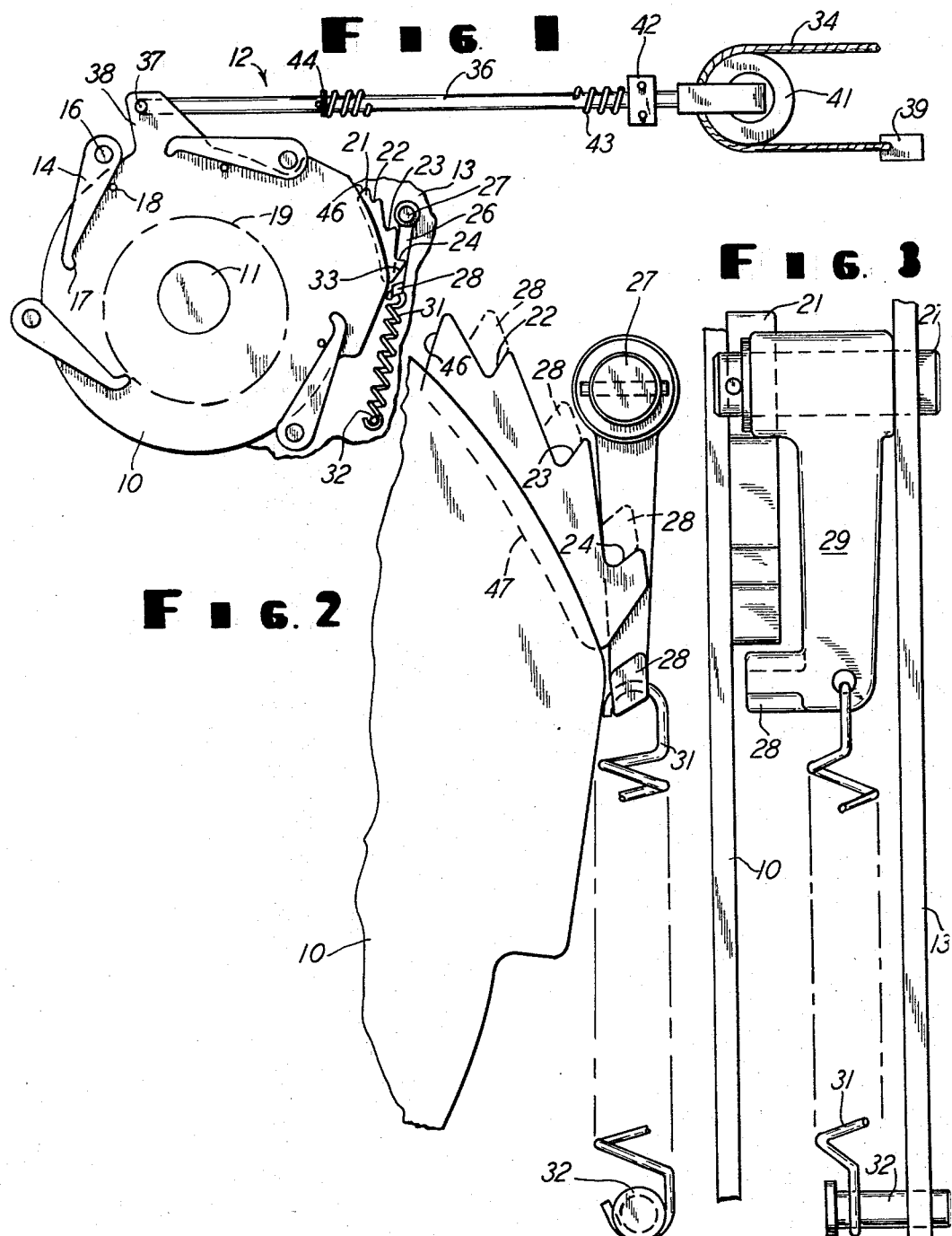

3,292,441
Patented Dec. 20, 1966

3,292,441
INDEX MECHANISM
Aaron M. Schaible, Rockford, Ill., assignor to J. I. Case Company, Racine, Wis., a corporation of Wisconsin
Filed Jan. 29, 1965, Ser. No. 429,006
5 Claims. (Cl. 74—17.5)

This invention relates to an index mechanism.

This particular invention has application in the indexing of members where it is desired to move one member and retain it in a selected position until release of the member is desired. In this general application, the mechanism has utility in agricultural implements, and more specifically it is useful in indexing the drive mechanism for the beater of a manure spreader or the like. U.S. Patent No. 3,036,837 shows wherein an index mechanism is utilized in connecting rotating members in a manner that selective speeds of rotation may be achieved between the two rotating members. In this patent, it will be seen with particular reference to for instance FIG. 6, the index plate is controlled by a member extending therefrom such that the plate is rotatably mounted and can be rotated so that various pawls will engage a ratchet wheel in transmitting rotation from the one rotating member to the other rotating member in varying speeds therebetween. Accordingly, the instant invention will be described in that art, and further, the disclosure of said patent will be referred to for one particular application of this mechanism.

It is a general object of this invention to provide an index mechanism which provides for the selective positioning between two parts which are relatively movable with respect to each other, and wherein the parts are indexed in movement of one of the parts in one direction, and the parts are also released or returned to their respective initial positions upon complete movement of the one part in the said one direction. That is, moving one part in one direction will cause both the indexing and release of the one part.

Another object of this invention is to provide an indexing mechanism which can be remotely controlled by a flexible member such as a rope, and therefore the control parts need not be rigid in character, but nevertheless the indexing mechanism will return to its initial position.

Still another object of this invention is to provide a reliable and sturdy indexing mechanism which does not require complicated parts nor expensive construction but yet is easily operated and is accurate in the operation of positioning the parts in selected indexed positions.

Still another specific object of this invention is to provide an indexing mechanism for transmitting motion between two parts, and to have the mechanism arranged so that the operator can readily determine the position in which the parts are disposed to observe the speeds at which the parts will operate with respect to each other. That is, the indexing mechanism may be utilized between two movable parts, such as parts which are used for transmitting rotation therebetween, and the mechanism is such that it will be apparent to the operator just which one of several selected positions the indexing mechanism is set in, and therefore the operator will know the speed of rotation transmitted between the movable parts.

Other objects and advantages will become apparent upon reading the following description in light of the accompanying drawings, wherein:

FIG. 1 is a side elevational view of a preferred embodiment of this invention with parts thereof broken away.

FIG. 2 is an enlarged side elevational view of a fragment of FIG. 1 showing parts thereof in different positions in dotted lines.

FIG. 3 is an end elevational view of FIG. 2, with a part added.

FIG. 1 shows a mechanism similar to that shown in U.S. Patent No. 3,036,837 in that it discloses a ratchet pawl throwout plate 10 which would be mountable on the side of a manure spreader or other implement where this mechanism has utility. Thus the plate 10 is comparable to the plate designated 216 in said patent and shown for instance in FIG. 6 thereof. The plate is rotatable on a shaft 11, and it is controlled in rotation by a control means generally designated 12 and more fully described later.

The piece fragmentarily shown and designated 13 may be the side of the manure spreader or other implement, and it is a stationary piece. A plurality of pawls 14 are pivotally mounted on the piece 13 by means of pins 16. It will be understood that the pawls 14 are spring-loaded to be urged with the ends 17 thereof moved toward the shaft 11, all in the customary manner of operating the indexing mechanism of this nature. Pins 18 restrain the pawls 14 from engagement with a ratchet wheel which is eccentric with respect to the shaft 11 and is indicated by the dot-dash line designated 19.

Generally, it will be understood by one skilled in the art that rotation of the plate 10 will move the pins 18 away from their respective pawls 14 so that the pawl end 17 can engage the teeth of the ratchet wheel designated by the circle 19. In this manner, rotation is transmitted between the shaft 11 and the ratchet wheel 19 which is otherwise rotatably mounted on the shaft 11 but is caused to rotate with the rotation of the shaft 11 when two of the pawls 14 engage the teeth on the ratchet wheel 19.

The aforementioned is conventional, and the following thus describes the indexing mechanism of this invention, and it relates it to the conventional mechanism described. The indexing plate 10 has a piece 21 affixed thereto such that the piece 21 rotates with the rotation of the plate 10. The piece 21 has a series of notches 22, 23, and 24 on the radially outer edge thereof as shown. FIG. 3 shows that the plate 21 is offset with respect to the plate 10, and this is for a purpose which will be apparent later.

A locking dog 26 is pivotally mounted on the piece 13 by means of a pivot pin 27. The lower end of the dog has a projection 28 which extends laterally of the main body 29 of the dog 26, as shown in FIG. 3. The projection 28 is shaped similar to the configuration of the notches 22, 23, and 24, and FIG. 2 shows the projection 28 in three dotted positions designated 28 and nested in the notches mentioned. The dotted showings of projection 28 are merely relative with respect to the index cam 21, and it will be of course understood that the locking dog 26 essentially remains in the position shown in the drawing while the plate 10 and its indexing cam 21 rotates to where the dog projection 28 engages the several notches described.

A tension spring 31 connects to one end of the dog 26 and is anchored on a pin 32 at the lower end of the spring 31. Thus the spring 31 constantly yielding urges the dog 26 into the position shown in FIG. 1, but of course it permits the dog to pivot sufficiently to have the prajection 28 ride over the cam surface 33 of the plate or cam 21 when the latter is rotated toward the projection 28. It will therefore be apparent that the spring 31 urges the pawl 26 to align on its elongated axis in the direction between the pins 27 and 32.

Thus, upon rotating the plate 10 to where a selected one of the notches 22, 23, or 24, is engaged with the projection 28, then the plate 10 is restrained from rotating back into the opposite direction, and then the selected ones of the pawls 14 are engaged with the ratchet wheel 19 for the necessary rotatable connection between the shaft 11 and the ratchet wheel 19.

FIG. 1 further shows the control mechanism 12 which permits the operator to rotate the plate 10 from a remote position such as his location on a tractor or the like. It is also significant to note that the control mechanism 12 can utilize a flexible member such as the rope 34, and yet the plate 12 is movable in both the clockwise and the counter-clockwise direction of rotation as will be apparent later. The mechanism 12 thus includes a rod 36 which is connected at its end 37 to a projection 38 on the plate 10 such that axial displacement of the rod 36 will control the rotated position of the plate 10. The rope 34 is anchored at a piece 39 which may be stationary on the spreader or the like. The rope extends over a pulley 41 to reverse the direction of the rope 34 and to permit the axial displacement of the rod 36 as mentioned. The rod 36 extends through a stationary mounting bracket 42 which may be mounted on the spreader in the fixed position. A compression spring 43 extends between the bracket 42 and a stop collar 44 on the rod 36. Thus, upon release of the tension or pull on the rope 34, the spring 43 will push against the collar 44, as permitted by the abutment of the spring 43 against the stationary bracket 42, and this will cause the plate 10 to rotate in the counter-clockwise direction as viewed in FIG. 1.

Of course the clockwise rotation of the plate 10 is induced by a pull on the rope 34, and such rotated position is retained by the pawl projection 28 engaging one of the selected notches 22, 23, or 24 on the plate 10. Further pull on the rope 34 will cause the upper edge 46 of the plate 21 to pass completely below the projection 28, and the latter therefore simply is free to slide along the back surface designated 47 of the index cam 21 as the plate 10 rotates counter-clockwise under the influence of the spring 43 as described. In this manner, the indexing mechanism is set in its selected position by movement of the plate 10 in one direction, and it is also released, with respect to being retained by the pawl 26, by further movement of the plate 10 in the said one direction. Accordingly, a flexible piece such as the rope 34 is all that is needed for complete control of the index mechanism.

While a specific embodiment of this invention has been shown and described, it should be obvious that certain changes could be made in the embodiment and the invention should therefore be determined only by the scope of the appended claims.

What is claimed is:

1. An indexing mechanism for securing a movable member in selected positions, comprising a series of notches arranged on said member and oriented in sequence along the path of movement of said member at the location of said notches, a locking dog movably mounted adjacent said member and having a projection separately engagable in said notches upon movement of said member in one direction from an initial position and past said projection for retaining said member against movement in the opposite direction, said locking dog being arranged with spring means to move said projection into said notches to sequentially become engaged in each of said notches upon movement of said member in said one direction, a cam surface on said member for engaging said projection to have the latter become disengaged from said notches when said member is moved in said one direction until said notches are beyond said projection, and return-spring means operatively associated with said member for moving the latter in said opposite direction to said initial position after said notches are beyond said projection.

2. An indexing mechanism, comprising a movable member to be secured in selected positions, a series of notches arranged on said member and oriented in sequence along the path of movement of said member at the location of said notches, a locking dog movably mounted adjacent said member and having a projection separately engagable in said notches upon movement of said member in one direction along the path from an initial position and past said projection for retaining said member against movement in the opposite direction along the path, said locking dog being arranged with spring means to urge said projection in a direction oblique to said path and to move said projection into said notches to sequentially become engaged in said notches upon movement of said member in said one direction and to become disengaged from said notches when said member is moved in said one direction until said notches are beyond said projection and free thereof, a spring operatively associated with said member for moving the latter in said opposite direction both for seating engagement of said projection in said notches and to return said member to said initial position after said notches are beyond said projection, and control means connected to said member for indexing the latter with respect to said projection in said one direction and against the influence of said spring.

3. An indexing mechanism for securing a rotatable member in selected positions, comprising a series of notches arranged on said member and oriented in sequence along the circular path of rotation of said member, a locking dog pivotally mounted adjacent said member and having a projection separately engageable in said notches upon rotation of said member in one direction from an initial position for retaining said member against rotation in the opposite direction, a tension spring means connected to said locking dog to dispose the latter tangentially of the circular path of movement of said member to urge said projection into said notches to sequentially become engaged in said notches upon rotation of said member in said one direction and to become disengaged from said notches when said member is rotated in said one direction until said notches are beyond said projection, and means operatively associated with said member for rotating the latter in said opposite direction to said initial position after said notches are beyond said projection.

4. An indexing mechanism for securing a rotatable member in selected positions, comprising a series of notches arranged on said member and arcuately disposed in sequence along the circular path of rotation of said member, a locking dog pivotally mounted adjacent said member and having a projection separately engageable in said notches upon rotation of said member in one direction from an initial position for retaining said member against rotation in the opposite direction, a tension spring means connected to said locking dog and arranged to move said projection into said notches to sequentially become engaged in said notches upon rotation of said member in said one direction and to become disengaged from said notches when said member is rotated in said one direction until said notches are beyond said projection, and control means operatively associated with said member and including a rope and a spring for respectively rotating said member in said one direction and said opposite direction to said initial position after said notches are beyond said projection.

5. An indexing mechanism for use intermediate a drive shaft and a driven wheel on a manure spreader, comprising a rotatable member mounted on said shaft and including an index cam having a series of notches arranged on said member and arcuately disposed in sequence along the circular path of rotation of said member, a locking dog pivotally mounted adjacent said member and having a projection separately engageable in said notches upon rotation of said member in one direction from an initial position for retaining said member against rotation in the opposite direction, a tension spring means connected to said locking dog and arranged to move said projection into said notches to sequentially become engaged in said notches upon rotation of said member in said one direction, said index cam having clearance with said rotatable member for movement of said index cam freely past said projection in the opposite direction when said member is rotated beyond the last one of said notches, and control means operatively associated with said member and including a rope and a spring for respectively rotating said member in said one direction and said opposite direction to said initial position after said notches are beyond said projection.

References Cited by the Examiner

UNITED STATES PATENTS

| | | | |
|---|---|---|---|
| 2,088,054 | 7/1937 | Crosman | 74—17.5 |
| 2,675,947 | 4/1954 | Wynn. | |
| 2,705,432 | 4/1955 | Lazar | 74—17.5 X |

FOREIGN PATENTS

| | | |
|---|---|---|
| 608,213 | 1/1935 | Germany. |

MILTON KAUFMAN, *Primary Examiner.*